(12) United States Patent
Ahn

(10) Patent No.: US 10,102,440 B2
(45) Date of Patent: Oct. 16, 2018

(54) LICENSE PLATE NUMBER INPUT DEVICE AND METHOD THEREFOR

(71) Applicant: REXGEN, Jeonju-si, Jeollabuk-do (KR)

(72) Inventor: Soon Hyun Ahn, Anyang-si (KR)

(73) Assignee: REXGEN, Jeonju-si, Jeollabuk-do (KR)

( * ) Notice: Subject to any disclaimer, the term of this patent is extended or adjusted under 35 U.S.C. 154(b) by 0 days.

(21) Appl. No.: 15/312,666

(22) PCT Filed: Oct. 14, 2015

(86) PCT No.: PCT/KR2015/010806
§ 371 (c)(1),
(2) Date: May 16, 2017

(87) PCT Pub. No.: WO2016/060453
PCT Pub. Date: Apr. 21, 2016

(65) Prior Publication Data
US 2017/0243074 A1     Aug. 24, 2017

(30) Foreign Application Priority Data

Oct. 16, 2014   (KR) .................. 10-2014-0139808

(51) Int. Cl.
*G06K 9/32*     (2006.01)
*G06F 3/02*     (2006.01)
*G06F 3/048*    (2013.01)
*G06F 3/16*     (2006.01)
*G06K 9/03*     (2006.01)

(52) U.S. Cl.
CPC ............ *G06K 9/325* (2013.01); *G06F 3/02* (2013.01); *G06F 3/048* (2013.01); *G06F 3/167* (2013.01); *G06K 9/033* (2013.01); *G06K 2209/15* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,092,979 B2 * | 7/2015 | Burry | .................. | G06K 9/033 |
| 9,183,572 B2 * | 11/2015 | Brubaker | ............... | G06Q 30/02 |
| 9,221,405 B2 * | 12/2015 | Davis | ...................... | B60R 25/00 |
| 9,235,941 B2 * | 1/2016 | Ricci | ....................... | H04W 4/21 |
| 9,349,140 B2 * | 5/2016 | Christy | .................. | G06Q 30/01 |
| 9,363,357 B2 * | 6/2016 | Hansen | ............. | H04M 1/72547 |
| 9,626,594 B2 * | 4/2017 | Soldevila | ............ | G06K 9/00624 |

(Continued)

FOREIGN PATENT DOCUMENTS

| | | | |
|---|---|---|---|
| KR | 10-1999-0081690 A | 11/1999 | |
| KR | 10-2001-0106018 A | 11/2001 | |

(Continued)

OTHER PUBLICATIONS

International Search Report for PCT/KR2015/010806 dated Feb. 2, 2016 from Korean Intellectual Property Office.

*Primary Examiner* — Anand Bhatnagar
(74) *Attorney, Agent, or Firm* — Revolution IP, PLLC

(57) ABSTRACT

A license plate number input device comprises: a characteristic information extraction unit for extracting characteristic information on a license plate from a vehicle image; a keypad provision unit for providing at least one input keypad on the basis of the extracted characteristic information; and an out unit for displaying input information input by a user through the provided input keypad.

13 Claims, 4 Drawing Sheets

(56) References Cited

U.S. PATENT DOCUMENTS

| | | | | |
|---|---|---|---|---|
| 9,663,043 B2* | 5/2017 | Belegu | ............ | B60R 13/10 |
| 9,760,789 B2* | 9/2017 | Burry | ............ | G06K 9/3258 |
| 2008/0308631 A1* | 12/2008 | Mitschele | ............ | G07B 1/08 |
| | | | | 235/384 |
| 2010/0265182 A1* | 10/2010 | Ball | ............ | G06F 3/0238 |
| | | | | 345/168 |
| 2014/0030280 A1* | 1/2014 | Polakis | ............ | A61K 31/551 |
| | | | | 424/181.1 |
| 2014/0036077 A1* | 2/2014 | Nerayoff | ............ | H04N 7/181 |
| | | | | 348/148 |
| 2014/0219563 A1* | 8/2014 | Rodriguez-Serrano | ............ | |
| | | | | G06K 9/18 |
| | | | | 382/182 |
| 2015/0113012 A1* | 4/2015 | Silver | ............ | H04L 51/38 |
| | | | | 707/758 |

FOREIGN PATENT DOCUMENTS

| | | |
|---|---|---|
| KR | 10-2003-0041613 A | 5/2003 |
| KR | 10-0384438 B1 | 5/2003 |
| KR | 10-2009-0004617 A | 1/2009 |
| KR | 10-2012-0016054 A | 2/2012 |

\* cited by examiner

<FIG.1>
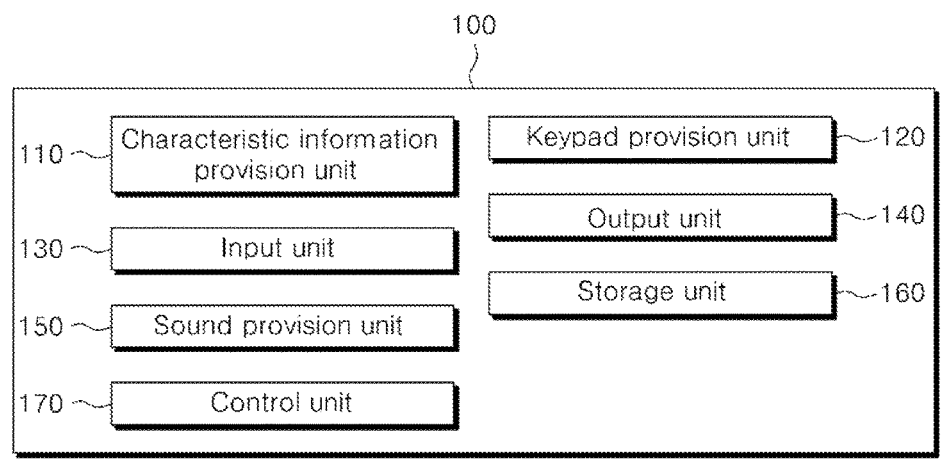
<FIG.2>
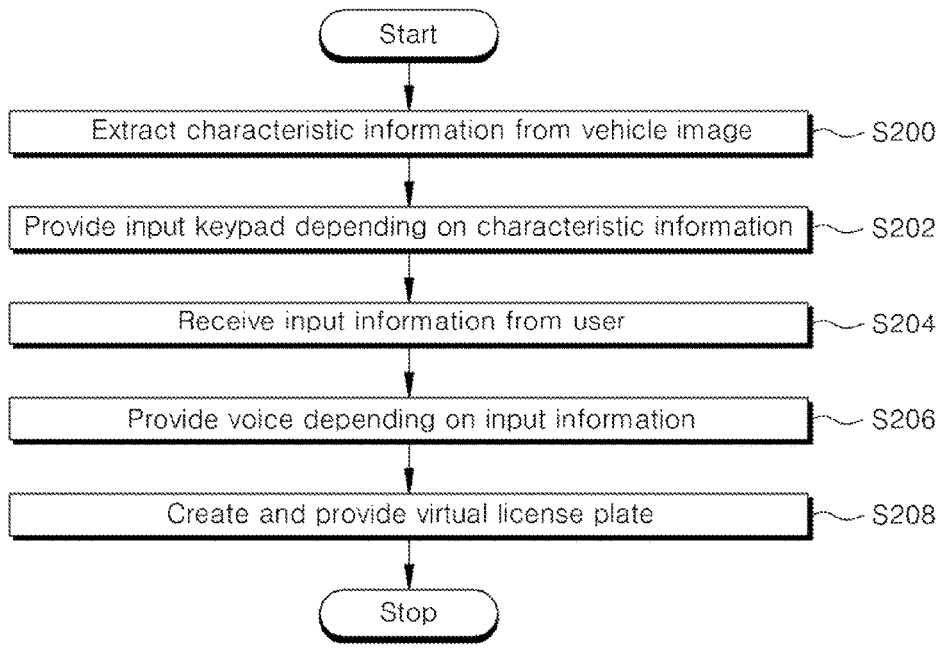

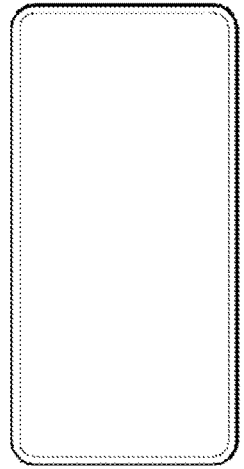
<FIG. 3A>
<FIG. 3B>
<Screen 1>
| Seoul | Gyeonggi | Incheon | Gangwon |
|---|---|---|---|
| Daejeon | Chungnam | Chungbuk | Jeonbuk |
| Busan | Gyeongnam | Daegu | Gyeongbuk |
| Ulsan | Gwangju | Jeonnam | Jeju |
<Screen 2>
| 1 | 2 | 3 |
|---|---|---|
| 4 | 5 | 6 |
| 7 | 8 | 9 |
|   | 0 |   |
<Screen 3>
| Ba | Sa |
|---|---|
| A | Ja |
<Screen 4>
| 1 | 2 | 3 |
|---|---|---|
| 4 | 5 | 6 |
| 7 | 8 | 9 |
|   | 0 |   |

<FIG. 3C>
| <Screen 1> | | | | <Screen 2> | | | |
|---|---|---|---|---|---|---|---|
| Seoul | Gyeonggi | Incheon | Gangwon | 1 | 2 | 3 | Ba |
| Daejeon | Chungnam | Chungbuk | Jeonbuk | 4 | 5 | 6 | Sa |
| Busan | Gyeongnam | Daegu | Gyeongbuk | 7 | 8 | 9 | A |
| Ulsan | Gwangju | Jeonnam | Jeju |  | 0 |  | Ja |
<FIG. 3D>
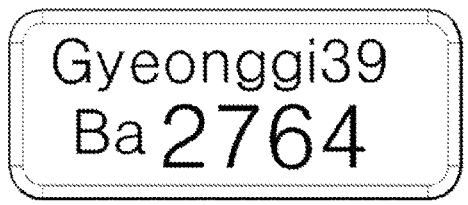
<FIG. 4A>
<FIG. 4B>
<Screen 1>
| 1 | 2 | 3 |
|---|---|---|
| 4 | 5 | 6 |
| 7 | 8 | 9 |
|   | 0 |   |
<Screen 2>
| g | n | d | r |
|---|---|---|---|
| m | b | s | ng |
| j | ch | k | t |
| p | h |   |   |
<Screen 3>
| Ga | Geo |
|---|---|
| Go | Gu |
<Screen 4>
| 1 | 2 | 3 |
|---|---|---|
| 4 | 5 | 6 |
| 7 | 8 | 9 |
|   | 0 |   |

<FIG. 4C>

LICENSE PLATE NUMBER INPUT DEVICE AND METHOD THEREFOR

TECHNICAL FIELD

The present disclosure relates to a device and methods for inputting a license plate number. More particularly, a device and methods consistent with the present invention relate to a license plate number input technology that provides a user with input keypads on the basis of characteristic information extracted from a captured vehicle image so that the user can more easily and quickly input a the license plate number to the device.

BACKGROUND ART

A license plate recognition system (LPRS) is a system used for identify license plates of vehicles. In this system, a vehicle passing through an n LPRS zone is photographed by a camera, and its license plate number is detected and read from a captured image of the vehicle, thereby identifying the vehicle. The license plate recognition system has been utilized in various fields, such as a speed enforcement system, a parking enforcement system, a security and surveillance system, etc.

In general license plate recognition systems, the correct recognition ratio for the license plates is in the range of 95% to 98%, and about 5% of captured license plates fails to be recognized due to poor photograph conditions, noises included in the captured images, damaged license plates, contaminated license plates, artificially veiled license plates, etc.

The misrecognized or unreadable data become a big obstacle to achieve primary objects of the license plate recognition system. For example, a city "S" in the capital area is running about 80 license plate recognition systems, and about 700,000 vehicles are captured for a day. In this case, even if the systems are operated in the optimal conditions which allow a recognition ratio of about 95%, the number of misrecognized license plates becomes about 35,000.

To identify the vehicles failing to be identified for a month, it is inevitable to check captured images of about 1,050,000 vehicles one by one by visual identification.

For the visual identification of the vehicle images, a preferable method is to input and compare the license plate numbers one by one. In this case, however, to input the license plate numbers by a known text input method using a keyboard is quite cumbersome and it takes much time.

Accordingly, a new license plate number input system capable of resolving problems described above should be proposed.

The background art of the present disclosure is disclosed in the Korean Patent Publication No. 1999-0081690 on Nov. 15, 1999.

DISCLOSURE

Technical Problem

The present disclosure has been made in an effort to provide a license plate number input device that provides a user with input keypads on the basis of characteristic information extracted from a captured vehicle image in order to quickly receive the license plate number from the user.

The present disclosure has been made in another effort to provide related methods.

Technical Solution

An exemplary embodiment of the present disclosure provides a license plate number input device which may include: a characteristic information extraction unit which extracts characteristic information of a license plate from a vehicle image; keypad provision unit which provides at least one input keypad on the basis of the extracted characteristic information; and an output unit which displays input information received from a user through the provided input keypad.

The license plate number input device may further include a control unit which creates a virtual license plate based on the input information received from the user through the input keypad and provides the created virtual license plate.

The control unit, together with the input keypad, may display a background image of the license plate based on the characteristic information through the output unit, and may create the virtual license plate by displaying the input information on the background image of the license plate.

The keypad provision unit may provide the input keypad for at least one among a color, districts, purposes of the vehicle, and numbers to the user based on the characteristic information, and may receive the input information from the input keypad.

The license plate number input device may further include an input unit which receives the input information received from user.

The license plate number input device may further include a sound provision unit which provides text to speech (TTS) based on the input information.

The characteristic information may include at least one among a color, a shape and a format of the license plate, whether a specific character is included in the license plate, and information on the characters included in the license plate.

Another exemplary embodiment of the present disclosure provides a license plate number input method which may include: extracting characteristic information of a license plate from a vehicle image; providing at least one input keypad on the basis of the extracted characteristic information; and displaying input information received from a user through the provided input keypad.

Advantageous Effects

The license plate number input device of the present disclosure provides the background image of the license plate and the input keypads according to the characteristic information extracted from the vehicle image, so that the user can easily and quickly input the license plate number.

Particularly, since the license plate shown in the vehicle image is compared with the virtual license plate, visual identification for the license plate in the vehicle image is enhanced and verification for the detected license plate number becomes easy.

DESCRIPTION OF DRAWINGS

FIG. 1 is a diagram showing a scheme of a license plate number input device in accordance with an exemplary embodiment of the present disclosure.

FIG. 2 is a flow chart showing a license plate number input method using the device shown in FIG. 1.

FIGS. 3A to 4C are diagrams for illustrating input keypads provided by the license plate number input device in accordance with the exemplary embodiment of the present disclosure.

BEST MODE

A device and methods consistent with the present disclosure relate to a license plate number input technology that provides a user with input keypads and a background image of a vehicle license plate on the basis of characteristic information extracted from a captured vehicle image so that the user can more easily and quickly input a the license plate number.

Hereinafter, a vehicle image refers to a captured image of a vehicle with its license plate. In some cases, it may be an image of only the license plate.

FIG. 1 is a diagram showing a scheme of a license plate number input device in accordance with an exemplary embodiment of the present disclosure.

As shown in FIG. 1, the license plate number input device in accordance with the exemplary embodiment of the present disclosure includes a characteristic information extraction unit 110, a keypad provision unit 120, an input unit 130, an output unit 140, a sound provision unit 150, a storage unit 160, and a control unit 170.

The characteristic information extraction unit 110 extracts characteristic information of the license plate from the vehicle image, and provides the extracted information to the keypad provision unit 120. In this case, to extract the characteristic information of the license plate, the characteristic information extraction unit 110 uses characteristic information extracting algorithms which have been already stored. However, in the case in which it is impossible to read the license plate with the characteristic information extracting algorithms, the characteristic information extraction unit 110 may receive information on the characteristics of the vehicle image from the user.

Here, the characteristic information includes a color, a shape and a format of the license plate, whether or not specific characters are included in the license plate, and so forth. In some cases, the characteristic information may further include information on the characters written in the license plate (for example, information on a font, a color and an arrangement of the characters).

The keypad provision unit 120 provides an input keypad to the user on the basis of the characteristic information of the license plate.

The keypad provision unit 120 can change the format of the input keypad according to the format of the license plate, but it is important to provide the input keypad which is optimized to the inputs of the characteristic information extracted from the vehicle image. For example, the format of the input keypad may vary according to the color of the license plate, or the user may select one input keypad among various keypads having the same format.

The input unit 130 receives the input information on the license plate number of the vehicle from the user via the input keypad. In some cases, the input unit 130 may receive information related to setting the device from the user.

The output unit 140 outputs the information received from the input unit 130 for the user to visually check the information.

Preferably, the input unit 130 includes an input means, such as a keyboard, a mouse, etc, and the output unit 140 includes an output means, such as an LCD (liquid crystal display), etc.

In the exemplary embodiment of the present disclosure, the input unit 130 and the output unit 140 are implemented as separate units. However, they may be implemented as an inseparable unit such as a touch screen and a touchpad so that input and output operations can be performed at the same time.

The sound provision unit 150 outputs the information, which has been inputted from the user via the input unit 130, in the form of voice so that the user can check whether there is an error in the information in real time. In this case, TTS (text to speech) algorithms are used.

The storage unit 160 matches the vehicle image with the inputted vehicle number and then stores a match. In addition, the storage unit 160 stores the number of inputs (for a district, a purpose, and a symbol) according to the provided input keypad.

The control unit 170 controls the respective units 110, 120, 130, 140 and 150 and a flow of data within the respective units. In addition, the control unit 170 creates a virtual license plate based on the characteristic information of the license plate and the information on the vehicle number inputted from the user, and provides the created virtual license plate to the user. Here, it is preferable that the virtual license plate is implemented to be similar to the practical license plate with reference to character information included in the characteristic information of the license plate (for example, a font, a color and an arrangement of the characters included in the practical license plate).

In addition, the control unit 170 may control the keypad provision unit 120 to provide the number of inputs to the storage unit 160 when it provides the input keypad.

Naturally, the control unit 170 may be configured so that input errors of the user are automatically detected and reported in real time. In this case, the number of inputs which should be performed at each step depending on the type of the provided input keypad is compared with the number of the inputs practically performed by the user to detect the input error of the user.

In this exemplary embodiment, the license plate number input device 100 is described as an independently device for ease of description, but the present disclosure is not necessarily limited thereto. That is, the license plate number input device 100 may be applicable to a license plate recognition system, an operation center system, etc. Differently, the license plate number input device 100 may be implemented as a program that will be installed in a terminal, such as a notebook, a computer, a smart phone, etc.

Hereinafter, a license plate number input method according to the exemplary embodiment of the present disclosure is described below with reference to the structure of the license plate number input device described above.

FIG. 2 is a flow chart for illustrating a license plate number input method using the device of FIG. 1, and FIGS. 3A to 4C are diagrams for illustrating input keypads provided by the license plate number input method in accordance with the exemplary embodiment of the present disclosure.

Referring to FIG. 2, at step S200, the characteristic information extraction unit 110 of the license plate number input device 100 in accordance with the exemplary embodiment of the present disclosure extracts information on characteristics of a license plate from a captured image of a vehicle. The characteristic information extraction unit 110 may provide the extracted characteristic information to the user via the output unit 140.

Then, the characteristic information extraction unit 110 provides the extracted characteristic information to the keypad provision unit 120. In this step, the output unit 140 may provide the vehicle image, in which the license plate is included, to the user through a screen.

Then, at step s202, the keypad provision unit 120 provides an input keypad to the user on the basis of the characteristic information of the license plate. Then, at step S204, the keypad provision unit 120 receives input information for the provided input keypad from the user.

Simultaneously, the sound provision unit 150 receives the input information from the user, and at step S206 outputs the input information in the form of voice in real time or after input of the information completely finishes. In this case, since the user can check the contents of the input information via the outputted voices simultaneously with inputting the information, it becomes possible to more accurately input the information.

Hereinafter, a case using the characteristic information related to a color of the license plate is described in detail with reference to FIGS. 3A to 3D.

First, if the license plate is yellow, the keypad provision unit 120 sequentially provides four input keypads, each showing districts, numbers, purposes of the vehicle (which are represented by symbols), and numbers, to the user as shown in FIG. 3B. However, in advance of the input keypads shown in FIG. 3B, the keypad provision unit 120 may provide a yellow background image of the corresponding license plate, as shown in FIG. 3A.

In Korea, the purposes of the vehicle having the yellow license plate are expressed by only four symbols, Ba, Sa, A, and Ja in the license plate. Accordingly, if the license plate is yellow, it is preferable that the keypad provision unit 120 provides the input keypad in which the four symbols representing the purposes of the vehicle are included so that the user can more easily and quickly input the corresponding information. In other words, it is preferable that the keypad provision unit 120 provides the input keypad to be automatically varied according to the characteristic information of the license plate.

Then, the input information from the user is displayed as the district, number, purpose, and number. Differently, it may be displayed as a virtual license plate as shown in FIG. 3D, which is created by the control unit 170 for the user to easily check the input information. This process corresponds to step S208 in the flowchart of FIG. 2.

Meanwhile, the keypad provision unit 120 may provide an input keypad like a screen 2 of FIG. 3C in which a screen 2 and a screen 3 of FIG. 3B are combined. In this case, it is possible to receive the license plate number from the user through only two input keypads shown in FIG. 3C.

Hereinafter, another case shown in FIGS. 4A to 4C is described. If the license plate is white, the keypad provision unit 120 sequentially provides the input keypads for numbers, purposes of the vehicle (which are represented by symbols), and numbers to the user as shown in FIG. 4B. However, in advance of the input keypads shown in FIG. 4B, the keypad provision unit 120 may provide a white background image of the corresponding license plate as shown in FIG. 4A.

A screen 2 of FIG. 4B is an input keypad in which 14 consonants of Hangul (which is the Korean alphabet) are included, and a screen 3 of FIG. 4B is an input keypad of Korean characters related to a specific consonant. When a specific consonant is selected in the keypad of the consonants, the Korean characters related to the selected consonant are displayed on the input keypad as shown in the screen 3.

Next, the keypad provision unit 120 displays the input information provided from the user via the input keypads on the white background image of FIG. 4A, thereby creating a virtual license plate of FIG. 4C.

Meanwhile, it is possible that the characteristic information extraction unit 110 applies the characteristic information of the vehicle license plate, which is obtained from a license plate number recognition device (not shown) during a process of recognizing the license plate number, to the license plate number input method of the exemplary embodiment of the present disclosure.

In addition, in the case in which the characteristic information of the license plate can't be extracted due to deterioration of image quality, the characteristic information extraction unit 110 may directly receive the characteristic information from the user and then create the virtual license plate on the basis of the received information.

As described above, the license plate number input device of the present disclosure provides the background image of the license plate and the input keypads according to the characteristic information extracted from the vehicle image, so that the user can easily and rapidly input the license plate number.

Particularly, since the license plate shown in the vehicle image is compared with the virtual license plate, visual identification for the license plate in the vehicle image is enhanced and verification for the detected license plate number becomes easy.

The exemplary embodiments of the present disclosure are not implemented only by the aforementioned method and/or apparatus, but may be implemented by a program for realizing a function corresponding to a construction according to an exemplary embodiment of the present disclosure or a recording medium on which the program has been recorded. Such an implementation will be evident to those skilled in the art to which the present disclosure pertains from the embodiments.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

The invention claimed is:

1. A license plate number input device comprising:
    a characteristic information extraction unit which extracts characteristic information of a license plate from a vehicle image;
    a keypad provision unit which provides at least one input keypad on the basis of the extracted characteristic information; and
    an output unit which displays input information received from a user through the provided input keypad.

2. The device of claim 1, further comprising a control unit which creates a virtual license plate based on the input information received from the user through the input keypad and provides the created virtual license plate.

3. The device of claim 2, wherein the control unit, together with the input keypad, displays a background image of the license plate based on the characteristic information through the output unit, and creates the virtual license plate by displaying the input information on the background image of the license plate.

4. The device of claim 1, wherein the keypad provision unit provides the input keypad for at least one among a color, districts, purposes of the vehicle, and numbers to the user based on the characteristic information, and receives the input information from the input keypad.

5. The device of claim 1, further comprising an input unit which receives the input information received from user.

6. The device of claim 1, further comprising a sound provision unit which provides text to speech (TTS) based on the input information.

7. The device of claim 1, wherein the characteristic information includes at least one among a color, a shape and a format of the license plate, whether a specific character is included in the license plate, and information on the characters included in the license plate.

8. A license plate number input method comprising:
extracting characteristic information of a license plate from a vehicle image;
providing at least one input keypad on the basis of the extracted characteristic information; and
displaying input information received from a user through the provided input keypad.

9. The method of claim 8, further comprising creating and providing a virtual license plate based on the input information received from the user through the input keypad.

10. The method of claim 9, further comprising displaying a background image of the license plate based on the characteristic information, together with the input keypad,
wherein the creating and providing of the virtual license plate includes displaying the characteristic information on the background image of the license plate.

11. The method of claim 8, wherein the providing of the input keypad includes providing the input keypad for at least one among a color, districts, purposes of the vehicle, and numbers to the user based on the characteristic information in order to receive the input information.

12. The method of claim 8, further comprising providing text to speech (TTS) based on the input information to the user.

13. The method of claim 8, wherein the characteristic information includes at least one among a color, a shape and a format of the license plate, whether a specific character is included in the license plate, and information on the characters included in the license plate.

* * * * *